W. S. STERLING.
TREE TREATMENT.
APPLICATION FILED NOV. 1, 1912.
1,094,490.
Patented Apr. 28, 1914.
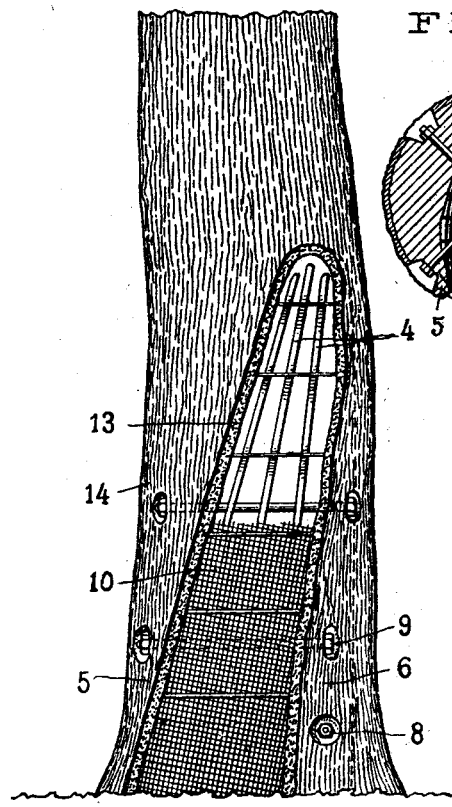
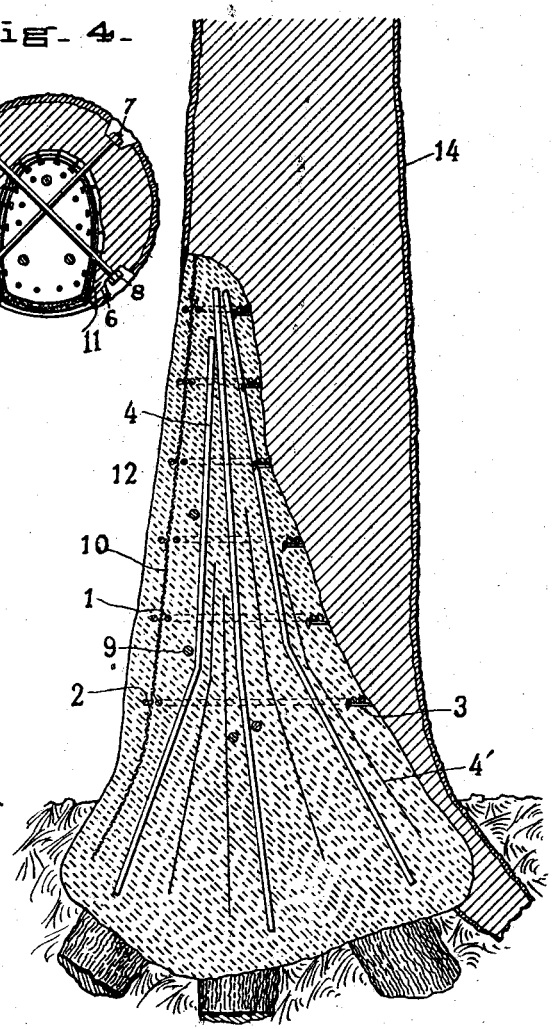
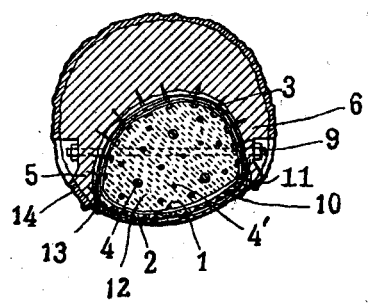
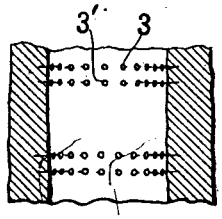
WITNESSES
E. Bradford
J. Cloyd Ripley
INVENTOR
Warner S. Sterling,
ATTORNEY.

UNITED STATES PATENT OFFICE.

WARNER S. STERLING, OF WESTWOOD, NEW JERSEY.

TREE TREATMENT.

1,094,490.

Specification of Letters Patent. Patented Apr. 28, 1914.

Application filed November 1, 1912. Serial No. 728,969.

*To all whom it may concern:*

Be it known that I, WARNER S. STERLING, a citizen of the United States of America, and residing at Westwood, in the county of Bergen and State of New Jersey, have invented new and useful Improvements in Tree Treatment, of which the following is a specification.

My invention relates particularly to the treatment of trees which have been weakened by decay or injury.

When trees are injured for instance, by limbs being broken off accidentally or by improper cutting or by abrasion, decay usually starts in and often results in the formation of cavities of considerable size. If neglected the decay will usually continue and aided by the work of insects and animals often destroys the tree. If these cavities are treated when small, for instance, by cleaning, the use of antiseptic solutions, waterproofing and filling with cementitious material, the injury may be slight and the cavities will not become larger. If the treatment is improperly applied or delayed, the cavity increases in size rapidly. Sometimes these cavities start in small openings as for instance, where a small limb has been cut off and the cavity is enlarged and remains largely or wholly inside the trunk of the tree so that it is invisible or scarcely noticeable. When a cavity becomes of any size the tree is so weakened, that it is likely to be broken off in a storm when the tree is subjected to severe strains. This has been known for some time and it has been customary to treat the cavities so as to prevent further decay. When the cavities are small they are cleaned and filled with cement so as to make the cavity less noticeable and so as to prevent fungi, insects and animals from entering. When a cavity is of any great height reinforcing rods are sometimes employed. By the methods commonly employed an opening at the edge of the cement forms. This permits the entry of water, insects and causes further decay. In the larger cavities, difficulty is often encountered by reason of the cracking of the cement when the tree sways considerably and the cement consequently falls out and the work has to be done over. Of course additional reinforcement in the way of longitudinal rods may be employed but I find that this does not always avail largely, I believe because of a peculiar twisting movement to which trees are subjected as they sway in the wind.

It is my object to avoid the above mentioned difficulties by a simple and inexpensive and readily applied means.

The complete construction embodying the features of my invention is shown and described herein but it will be obvious that in different cases certain of the features may be employed and others omitted depending upon the conditions met with in practice such for instance, as the size and shape and location of the cavity relative to the size, shape and strength of the tree. If the cavity is of considerable length, the reinforcement will consist of cement with wires or steel rods embedded in various positions throughout the cement. Hoops or rings of metal will be located in the cement close to the wood of the tree so as in effect to surround the cement and reinforce it horizontally. This is particularly useful where the cavity is more or less inclined so that the tree tends to twist in swaying. These hoops are supported in the process of construction by spikes driven into the walls of the cavity. Reticulated metal such as wire mesh or expanded metal is secured just back of the mouth of the cavity for instance, by nails driven into the wood. This holds the cement together across the mouth of the cavity and prevents it from falling out even if it becomes cracked. It also serves as a wall for the cement when filling the cavity. If the cavity is of large diameter, relative to the trunk of the tree and especially if the cavity extends down to near the ground, the opposite side walls of the trunk are bolted together. By arranging these bolts so that they cross each other they resist the twisting of the tree around the cement. If the cavity extends into the roots of the tree of course the reinforcements extend into the ground. The outer surface of the cement in the cavity is shaped to correspond with the general outline of the body of the tree leaving the edge of the bark around the cavity exposed. It has been customary to cover the cement and the edge of the bark with metal sheets supposedly for the purpose of keeping out the water but I have found that this is the cause of a great deal of difficulty. It is impossible to keep the edges of the sheet tight and consequently insects work under the edges of the metal sheet and into the wood and carry on their work without observation. Water also works in and causes decay. I accordingly apply a waterproofing compound to the outer surface of the cement and cover the edges of the bark and the cement around the cavity with a semi-plastic composition which will remain plastic for a long time, say one year. This excludes the moisture and insects as well and enables the bark to grow over the edge of the cement and automatically effects a permanent waterproof and insect-proof joint.

In the accompanying drawings—Figure 1, is an elevation of a portion of a tree trunk showing my method of treatment. Fig. 2, is a vertical sectional view. Fig. 3, is a horizontal sectional view. Fig. 4, is another horizontal sectional view. Fig. 5, is a vertical sectional view showing a modification of the arrangement of the horizontal reinforcement.

At intervals are arranged horizontal hoops or rings 1 and 2 of wire or rod. Each hoop is supported on a row of spikes 3 which are securely driven into the trunk around the wall of the cavity. Double rows of spikes such as 3, 3' may be arranged at intervals as shown in Fig. 5 when additional horizontal reinforcement is required.

Vertical reinforcing rods or wires such as 4 and 4' are provided of a suitable number and arranged in the trunk to give such additional strength as the particular case in hand may require.

The side walls 5 and 6 of the trunk may be connected by bolts such as 7, 8 and 9 which traverse the cavity as shown particularly in Figs. 3 and 4.

The reticulated sheet 10 of wire or metal lath is secured to the mouth of the cavity for instance by nails such as 11 driven into the wood within the cavity. A continuous strip of reticulated metal may be used extending from the top to the bottom of the cavity unless the cavity is too large for the available metal lath, in which case of course, it will be necessary to piece out the lath. The metal lath and hoops 1 and 2 are preferably arranged so that one hoop such as 1 is inside the lath and the other hoop such as 2 outside the lath so as to better hold the parts in position. When the metal parts are in position, the lath being left loose at the top however to facilitate filling, the cementitious composition 12 consisting for instance of hydraulic cement, sand, gravel or small stone is filled in. Where the cavity does not require a great reinforcement, for instance, small cavities, a suitable filling of cement such as plaster and light material such as ground cork may be advantageously employed.

When the metal lath is fastened in place and the filling is completed, the outer surface of the metal lath is plastered to bring the general outline of the cement out to the circumference of the body of the tree, see Figs. 3 and 4 which may be then treated with a waterproofing compound and the semi-plastic material 13 applied around the edges 14 of the bark and the edges of the cement. By the term "semi-plastic coating" I mean, a coating which remains plastic and adhesive for a considerable period of time for instance six months or a year without cracking off and which may permit the bark to grow underneath and at the same time makes a waterproof joint between the wood and the cement.

It will be noted that the cementitious filling is practically monolithic and is held together vertically and horizontally and is anchored to the trunk, and its outer surface so reinforced, that although the tree may sway somewhat, the filling cannot become cracked and fall out.

It will be obvious that many changes may be made in details of construction such as the materials employed and the arrangement and certain elements may be omitted or others added without departing from the spirit or scope of my invention it being intended that the terms employed in the claims are of description rather than limitation except so far as required by the prior art.

What I claim is:—

1. A reinforcement for the cavity of a tree, consisting of a filling of cementitious material within the cavity and horizontal reinforcing means extending entirely around within the cementitious filling and disposed substantially within the circumference of the cavity.

2. A reinforcement for the cavity of a tree, consisting of a body of cementitious material within the cavity and horizontal reinforcing means extending entirely around the cementitious material within the circumference of the cavity and consisting of rows of spikes driven into the walls of the cavity and continuous hoops adjacent the spikes, the heads of the spikes being embedded in the cement.

3. A reinforcement for a cavity of a tree, consisting of a filling of cementitious material within the cavity with metallic reinforcements embedded in the said filling and a reticulated metal lath secured to the walls of the cavity around the edges of the filling and embedded in the cement just inside of the outer face of the filling.

4. A reinforcement for a cavity of a tree, consisting of a filling body of cement within the cavity and a sheet of recticulated metal secured to the walls of the cavity at the edges of the filling and embedded in the cement to prevent the cement from cracking and from falling out.

5. A reinforcement for a cavity of a tree, consisting of a filling of cementitious material within the cavity, a reticulated metal lath secured to the walls of the cavity at the edges of the filling and embedded in the cement adjacent the outer surface of the same, and horizontal hoops extending around and embedded in the cement.

6. A reinforcement for a cavity of a tree, consisting of a filling of cementitious material within the cavity, a reticulated metal lath secured to the walls of the cavity at the edges of the filling and embedded in the cement adjacent the outer surface of the same, and horizontal hoops extending around and embedded in the cement, some of said hoops extending outside of said metal lath.

7. A reinforcement for a cavity of a tree, consisting of a filling of cementitious material within the cavity, a reticulated metal lath secured to the walls of the cavity at the edges of the filling and embedded in the cement adjacent the outer surface of the same and horizontal hoops extending around and embedded in the cement, some of said hoops extending outside of said metal lath and some of said hoops extending entirely inside of said metal lath.

8. A reinforcement for a cavity of a tree, consisting of a filling of cement within the cavity extending outward to the mouth of the cavity with metal lath embedded in the cement adjacent the outer surface of the same at the mouth of the cavity and vertical reinforcing members embedded in the central portion of the cement.

9. A reinforcement for a cavity of a tree consisting of a filling of cement within the cavity extending outward to the mouth of the cavity and having metal lath embedded in the cement adjacent the outer surface of the same at the mouth of the cavity and horizontal reinforcing bolts passing through opposite walls of the trunk and crossing each other and embedded in the cement.

10. A reinforcement for a cavity of a tree consisting of a filling of cement within the cavity, horizontal reinforcement in the cement to prevent twisting and metal lath embedded in the cement and attached to the walls of the cavity at the edges of the filling.

11. A reinforcement for a cavity of a tree, consisting of a filling of cement within the cavity, horizontally arranged reinforcing hoops extending entirely around substantially the entire body of the cement filling and horizontal bolts extending through opposite walls of the cavity and embedded in the cement between said horizontal hoops.

WARNER S. STERLING.

Witnesses:
K. S. ALLYN,
E. BRADFORD.